United States Patent
Moriya et al.

(10) Patent No.: US 9,001,892 B2
(45) Date of Patent: Apr. 7, 2015

(54) MOVING IMAGE ENCODER AND MOVING IMAGE DECODER

(75) Inventors: Yoshimi Moriya, Tokyo (JP); Yoshihisa Yamada, Tokyo (JP); Shunichi Sekiguchi, Tokyo (JP); Yoshiaki Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 999 days.

(21) Appl. No.: 13/129,253

(22) PCT Filed: Nov. 13, 2009

(86) PCT No.: PCT/JP2009/006082
§ 371 (c)(1),
(2), (4) Date: May 13, 2011

(87) PCT Pub. No.: WO2010/055675
PCT Pub. Date: May 20, 2010

(65) Prior Publication Data
US 2011/0216830 A1    Sep. 8, 2011

(30) Foreign Application Priority Data
Nov. 14, 2008 (JP) .................... 2008-292381

(51) Int. Cl.
H04N 7/32         (2006.01)
H04N 19/59        (2014.01)
H04N 19/593       (2014.01)

(52) U.S. Cl.
CPC ............ *H04N 19/59* (2013.01); *H04N 19/593* (2013.01)

(58) Field of Classification Search
CPC .................. H04N 19/00757; H04N 19/00763

USPC ........................................... 375/240
See application file for complete search history.

(56) References Cited

U.S. PATENT DOCUMENTS

2007/0053443 A1    3/2007 Song
2009/0110068 A1    4/2009 Suzuki et al.

FOREIGN PATENT DOCUMENTS

JP            63-1184 A      1/1988
JP         2006-352636 A    12/2006
(Continued)

OTHER PUBLICATIONS

"Advanced video coding for generic audiovisual services", ITU-T Recommendation H.264, Nov. 2007.
(Continued)

*Primary Examiner* — Jamie Atala
*Assistant Examiner* — Nguyen Truong
(74) *Attorney, Agent, or Firm* — Birch, Stewart, Kolasch & Birch, LLP

(57) ABSTRACT

A moving image encoder has an image separating unit (1) for generating four separate images (1)-(4) by sampling pixels constituting an input image every two alternate pixels in the horizontal direction and each alternate pixel in the vertical direction. An intraframe predictive coding unit performs intraframe predictive coding of the separate image (1) by using pixels constituting the separate image (1) produced by the image separating unit (1). An inter-separate image predictive coding unit 12 performs inter-separate image predictive coding of the separate images (2)-(4) produced by the image separating unit 1 by using the pixels constituting the separate image (1) produced by the image separating unit (1).

5 Claims, 10 Drawing Sheets

(56) References Cited

FOREIGN PATENT DOCUMENTS

| | | |
|---|---|---|
| JP | 2007-053554 A | 1/2007 |
| JP | 2007-74725 A | 3/2007 |
| JP | 2007-151062 A | 6/2007 |
| JP | 2008-125002 A | 5/2008 |
| WO | WO 2007/100221 A1 | 9/2007 |

OTHER PUBLICATIONS

Overview of the H.264/AVC video coding standard, IEEE Transactions on Circuits and Systems for Video Technology, vol. 13, No. 7, Jul. 2003, pp. 560-576.

Boundary

MOVING IMAGE ENCODER AND MOVING IMAGE DECODER

TECHNICAL FIELD

The present invention relates to a moving image encoder for separating an image into a plurality of pieces and for coding them, and to a moving image decoder for decoding an image separated into a plurality of pieces and coded.

BACKGROUND ART

An international standard video coding method such as "MPEG-4 AVC/H.264" (referred to as "AVC" from now on) disclosed in Non-Patent Document 1 divides an image into blocks with an N×N pixel size and performs orthogonal transform such as a DCT (Discrete Cosine Transform), quantization and entropy coding of a predictive differential signal with the N×N pixel size, which is obtained by executing intraframe/interframe predictions on a block basis.

When executing predictive coding within a frame, the AVC acquires a differential signal by performing a prediction using pixels of adjacent blocks after the coding. As modes of the prediction, the total of nine modes is prepared which include an average prediction and which execute prediction from eight predictive directions.

When coding a moving image with a high resolution beyond a resolution (1920×1080) handled by a current HDTV (High Definition TV) by a conventional coding method, a method is employed which divides a picture and codes them in parallel to reduce a circuit size involved in an increase of arithmetic operations (see Patent Document 1, for example).

For example, when coding a moving image with 4096×2160 pixels, the coding is performed on a separate picture by separate picture basis with 2048×1080 pixels after quartering the single picture.

In this case, if the coding is carried out without cooperation in allocating a code amount among the separate pictures, differences in image quality can occur among the individual separate pictures. Accordingly, combining the separate pictures into a single picture will bring about unnatural deterioration in the image quality at boundaries.

To prevent such image quality deterioration, the following Patent Document 2 discloses a system which includes a unit for calculating for each separate picture a generated code amount and distortion characteristic as post processing of the coding and for storing the generated code amount and the distortion characteristic, and which determines the allocation of the code amount by estimating the code amounts of succeeding separate pictures by referring to the code amounts-distortion characteristics of the preceding separate pictures when coding the following picture.

As another method of coding a moving image with a resolution beyond the HDTV, Patent Document 2 discloses a system which produces two separate images by dividing an original image each alternate pixel on a block basis with an N×N pixel size, and which predicts a second separate image from a first separate image, followed by performing variable length coding of a differential signal.

PRIOR ART DOCUMENT

Non-Patent Document

Non-Patent Document 1: MPEG-4 AVC (ISO/IEC 14496-10)/ITU-T H.264 standards.

Patent Document

Patent Document 1: Japanese Patent Laid-Open No. 2006-352636.
Patent Document 2: Japanese Patent Laid-Open No. 2008-125002.

DISCLOSURE OF THE INVENTION

The conventional moving image encoders are configured as described above. Thus, the system of Patent Document 1 cannot use the code amount-distortion characteristics of a past picture when a scene change occurs. Accordingly, it is configured in such a manner as to simply allocate the code amount equally, thereby offering a problem of deteriorating the image quality of a picture after the scene change. In addition, since it must calculate the code amount-distortion characteristics for each separate picture as the post processing of coding, it has a problem of increasing the arithmetic operations of the post processing.

The system of Patent Document 2 has a difficulty in parallel processing because it produces separate images on a block basis of N×N pixel size, thereby offering a problem of increasing the circuit size.

The present invention is implemented to solve the foregoing problems. Therefore it is an object of the present invention to provide a moving image encoder capable of achieving high coding efficiency by suppressing the image quality deterioration and an increase of the circuit size.

Another object of the present invention is to implement a moving image decoder capable of displaying an original high resolution image by properly decoding the image encoded at the high coding efficiency.

A moving image encoder in accordance with the present invention is configured in such a manner that it has a separate image generating unit for producing a first separate image by sampling pixels constituting an input image at predetermined intervals, and for producing at least one second separate image by sampling pixels different from the foregoing pixels at predetermined intervals; that an intraframe predictive coding unit carries out predictive coding of the first separate image within a frame by using the pixels constituting the first separate image produced by the separate image generating unit; and that an inter-separate image predictive coding unit carries out, between the separate images, predictive coding of the second separate image produced by the separate image generating unit by using the pixels constituting the first separate image produced by the separate image generating unit.

According to the present invention, it is configured in such a manner that it has the separate image generating unit for producing the first separate image by sampling pixels constituting the input image at predetermined intervals, and for producing at least one second separate image by sampling pixels different from the foregoing pixels at predetermined intervals; that the intraframe predictive coding unit carries out predictive coding of the first separate image within the frame by using the pixels constituting the first separate image produced by the separate image generating unit; and that the inter-separate image predictive coding unit carries out, between the separate images, predictive coding of the second separate image produced by the separate image generating unit by using the pixels constituting the first separate image produced by the separate image generating unit. Accordingly, it offers an advantage of being able to achieve high coding efficiency by reducing image quality deterioration and a circuit size.

BEST MODE FOR CARRYING OUT THE INVENTION

The best mode for carrying out the invention will now be described with reference to the accompanying drawings to explain the present invention in more detail.

Embodiment 1

Figure 1:
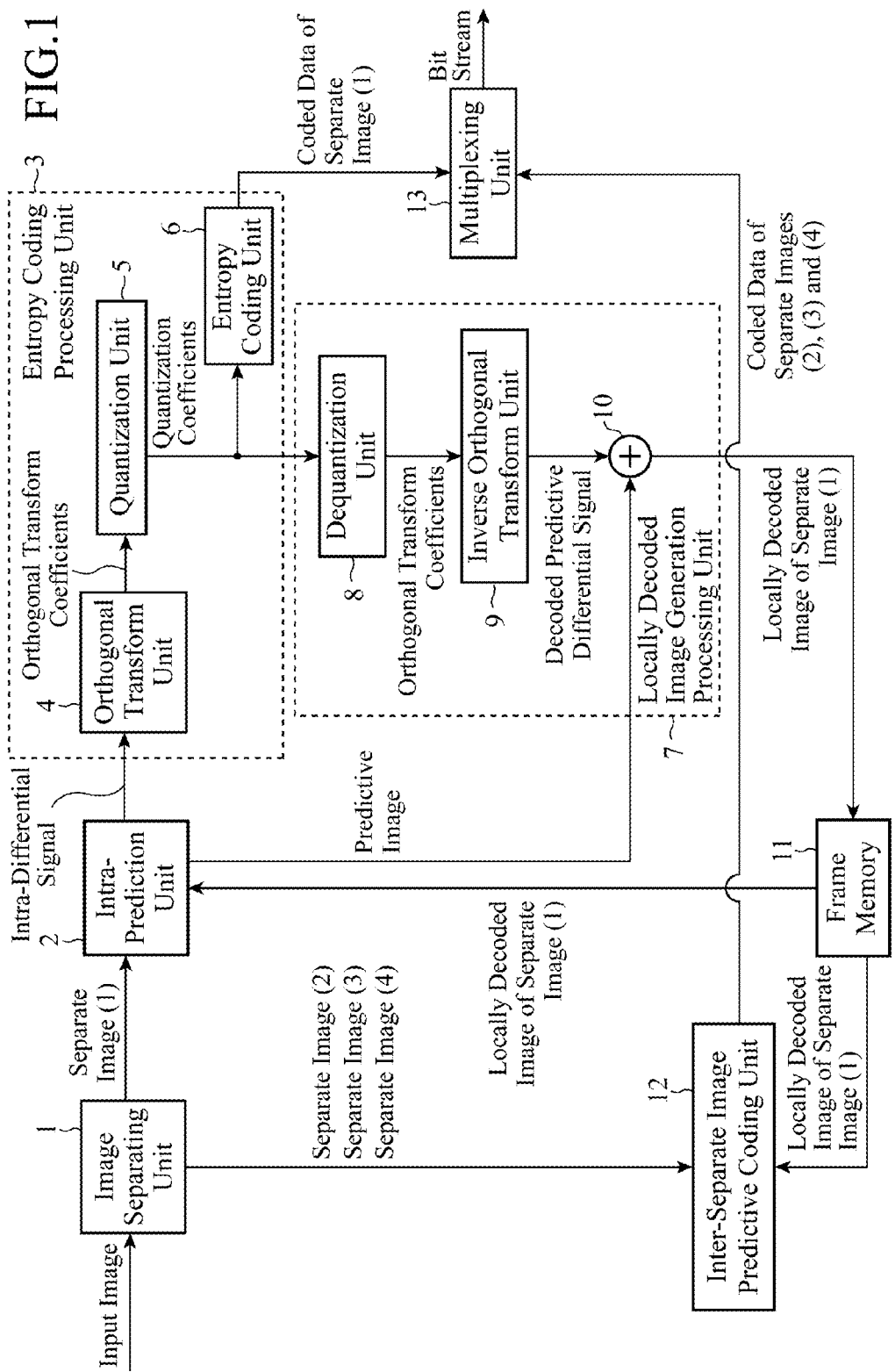
FIG. 1 is a block diagram showing a configuration of a moving image encoder of an embodiment 1 in accordance with the present invention.

FIG. 1 is a block diagram showing a configuration of a moving image encoder of an embodiment 1 in accordance with the present invention.

In FIG. 1, an image separating unit 1 executes processing of generating a separate image (1) (first separate image) by sampling pixels constituting an input image at predetermined intervals, and of generating separate images (2)-(4) (second separate images) by sampling pixels different from the foregoing pixels at predetermined intervals. Incidentally, the image separating unit 1 constitutes a separate image generating unit.

An intra-prediction unit 2 executes processing of generating a predictive image of the separate image (1) by executing intra-prediction (intraframe prediction) of the separate image (1) produced by the image separating unit 1 on a block basis of a prescribed size, and of supplying an intra-differential signal, which represents a differential image between the separate image (1) and the predictive image, to an entropy coding processing unit 3. Incidentally, the intra-prediction unit 2 constitutes a first differential image output processing unit.

The entropy coding processing unit 3 executes processing of performing an orthogonal transform of the intra-differential signal output from the intra-prediction unit 2 on a block basis, and of carrying out entropy coding of the orthogonal transform coefficients obtained as a result of the orthogonal transform. Incidentally, the entropy coding processing unit 3 constitutes a first entropy coding processing unit.

An orthogonal transform unit 4 of the entropy coding processing unit 3 executes processing of performing the orthogonal transform of the intra-differential signal output from the intra-prediction unit 2 on a block basis, and of supplying the orthogonal transform coefficients to a quantization unit 5.

The quantization unit 5 of the entropy coding processing unit 3 executes processing of quantizing the orthogonal transform coefficients output from the orthogonal transform unit 4, and of supplying the quantization coefficients to an entropy coding unit 6 and to a locally decoded image generation processing unit 7.

The entropy coding unit 6 of the entropy coding processing unit 3 executes processing of carrying out entropy coding of the quantization coefficients supplied from the quantization unit 5.

The locally decoded image generation processing unit 7 executes processing of generating a locally decoded image of the separate image (1) by dequantizing the quantization coefficients output from the quantization unit 5, by carrying out inverse orthogonal transform of the orthogonal transform coefficients obtained as a result of the dequantization, and by adding the decoded predictive differential signal obtained as a result of the inverse orthogonal transform and the predictive image produced by the intra-prediction unit 2.

A dequantization unit 8 of the locally decoded image generation processing unit 7 executes processing of dequantizing the quantization coefficients supplied from the quantization unit 5, and of supplying the orthogonal transform coefficients obtained as a result of the dequantization to an inverse orthogonal transform unit 9.

The inverse orthogonal transform unit 9 of the locally decoded image generation processing unit 7 executes processing of performing an inverse orthogonal transform of the orthogonal transform coefficients supplied from the dequantization unit 8, and of supplying the decoded predictive differential signal obtained as a result of the inverse orthogonal transform to an addition unit 10.

The addition unit 10 of the locally decoded image generation processing unit 7 executes processing of adding the decoded predictive differential signal supplied from the inverse orthogonal transform unit 9 and the predictive image produced by the intra-prediction unit 2, and of outputting the locally decoded image of the separate image (1) which is a result of the addition.

Incidentally, the intra-prediction unit 2, entropy coding processing unit 3 and locally decoded image generation processing unit 7 constitute an intraframe predictive coding unit.

A frame memory 11 is a memory for storing the locally decoded image of the separate image (1) produced by the locally decoded image generation processing unit 7.

An inter-separate image predictive coding unit 12 executes processing of carrying out predictive coding of the separate images (2)-(4) between the separate images which are produced by the image separating unit 1 by using pixels constituting the locally decoded image of the separate image (1) stored in the frame memory 11. Incidentally, the inter-separate image predictive coding unit 12 constitutes an inter-separate image predictive coding unit.

A multiplexing unit 13 executes processing of generating a bit stream by multiplexing the coded data of the separate image (1) supplied from the entropy coding processing unit 3 and the coded data of the separate images (2)-(4) supplied from the inter-separate image predictive coding unit 12. Incidentally, the multiplexing unit 13 constitutes a multiplexing unit.

Figure 2:
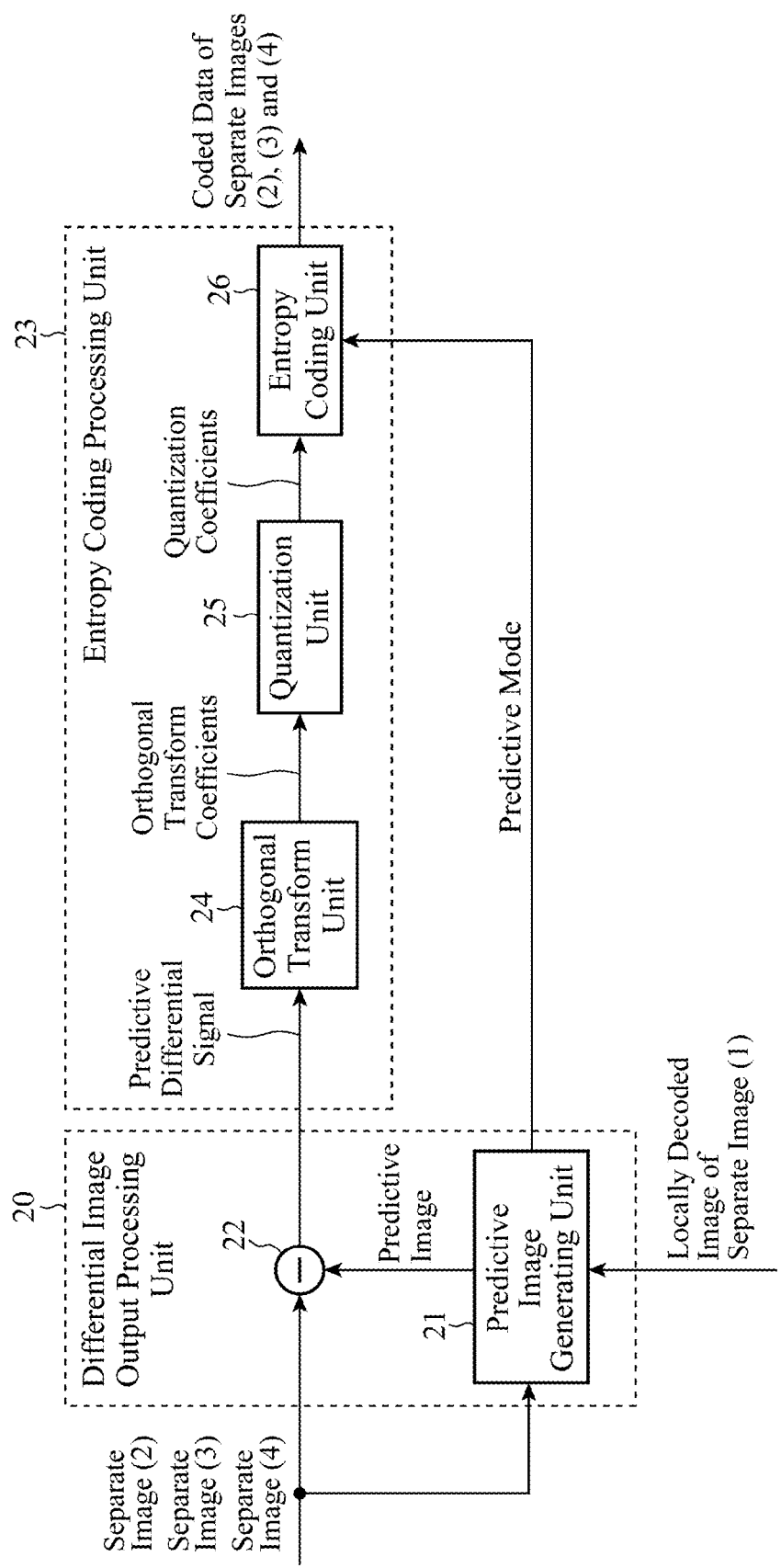
FIG. 2 is a block diagram showing a configuration of an inter-separate image predictive coding unit 12 of the moving image encoder of the embodiment 1 in accordance with the present invention.

FIG. 2 is a block diagram showing a configuration of the inter-separate image predictive coding unit 12 of the moving image encoder of the embodiment 1 in accordance with the present invention.

In FIG. 2, a differential image output processing unit 20, using pixels constituting the locally decoded image of the separate image (1) stored in the frame memory 11, executes processing of generating predictive images of the separate images (2)-(4) produced by the image separating unit 1, and of supplying an entropy coding processing unit 23 with a predictive differential signal representing differential images between the predictive images and the separate images (2)-(4). Incidentally, the differential image output processing unit 20 constitutes a second differential image output processing unit.

A predictive image generating unit 21 of the differential image output processing unit 20, using the pixels constituting the locally decoded image of the separate image (1) stored in the frame memory 11, executes processing of generating the predictive images of the separate images (2)-(4) produced by the image separating unit 1.

More specifically, the predictive image generating unit 21 executes processing of selecting a predictive mode suitable for correcting shifts in pixel positions between the separate image (1) and the separate images (2)-(4) produced by the image separating unit 1 from a plurality of predictive modes, and of generating the predictive images of the separate images (2)-(4) in that predictive mode.

A subtraction unit 22 of the differential image output processing unit 20 executes processing of obtaining the differential images between the separate images (2)-(4) produced by the image separating unit 1 and the predictive images produced by predictive image generating unit 21, and of supplying the predictive differential signal representing the differential images to the entropy coding processing unit 23.

The entropy coding processing unit 23 executes processing of performing an orthogonal transform of the predictive differential signal supplied from the differential image output processing unit 20 on a block basis, and of carrying out entropy coding of the orthogonal transform coefficients obtained as a result of the orthogonal transform. Incidentally, the entropy coding processing unit 23 constitutes a second entropy coding processing unit.

An orthogonal transform unit 24 of the entropy coding processing unit 23 executes processing of performing the orthogonal transform of the predictive differential signal supplied from the differential image output processing unit 20 on a block basis, and of supplying the orthogonal transform coefficients to a quantization unit 25.

The quantization unit 25 of the entropy coding processing unit 23 executes processing of quantizing the orthogonal transform coefficients supplied from the orthogonal transform unit 24, and of supplying the quantization coefficients to an entropy coding unit 26.

The entropy coding unit 26 of the entropy coding processing unit 23 executes processing of carrying out entropy coding of the quantization coefficients output from the quantization unit 25 and of the predictive mode selected by the predictive image generating unit 21.

Next, the operation will be described.

Figure 3:
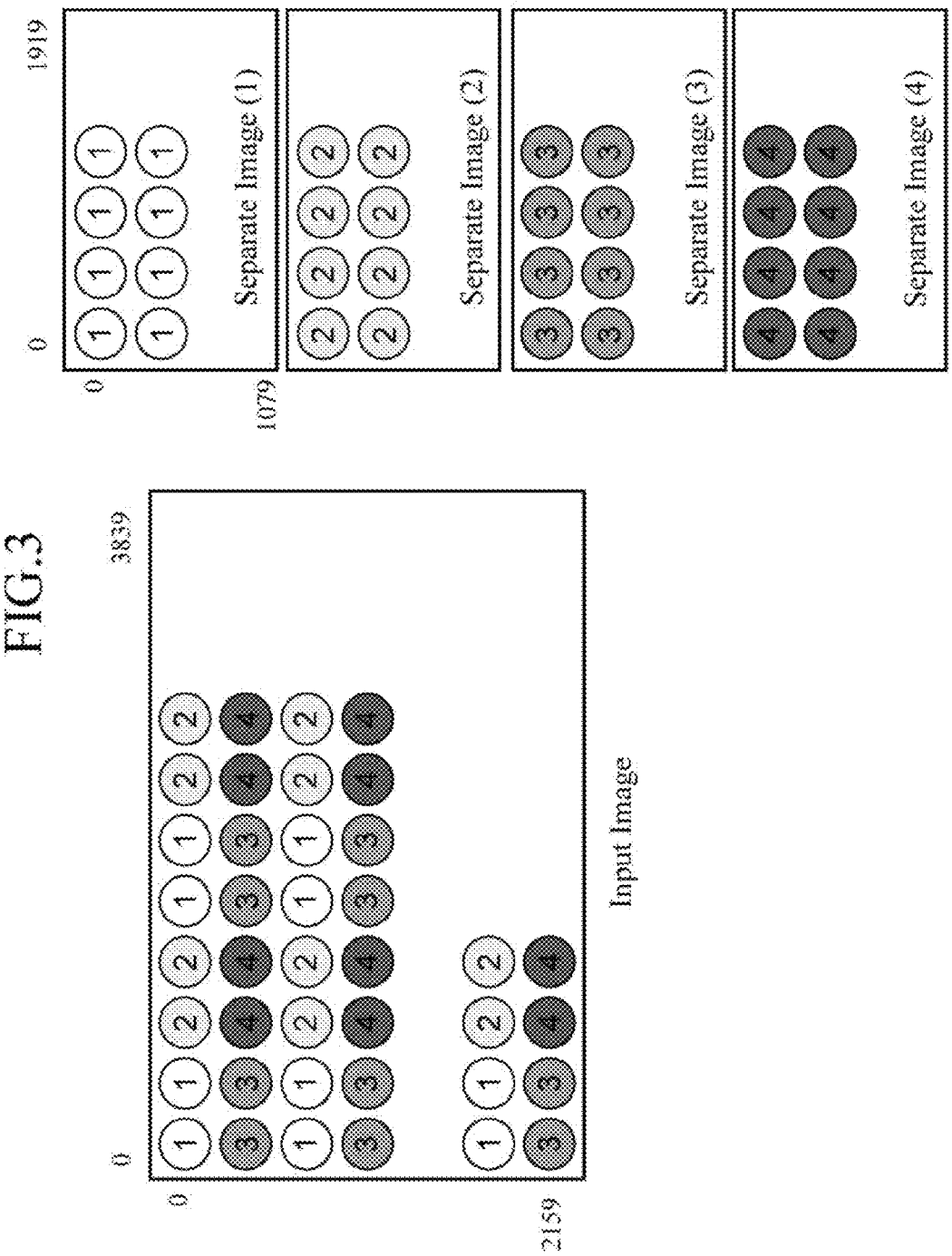
FIG. 3 is a diagram showing an example of an input image and separate images (1)-(4)

The present embodiment 1 will be described using an example in which the image separating unit 1 receives a moving image with 3840×2160 pixels as shown in FIG. 3 and codes the moving image.

The image separating unit 1, receiving the moving image, samples the pixels constituting the moving image at predetermined intervals to generate the separate image (1) and samples the pixels different from the foregoing pixels at predetermined intervals to generate the separate images (2)-(4).

FIG. 3 shows an example of generating the four separate images (1), (2), (3), (4) with a pixel size of 1920×1080 by sampling every two alternate pixels in the horizontal direction and alternate pixel in the vertical direction.

Incidentally, the separate image (1) is supplied to the intra-prediction unit 2 on a block basis of the prescribed size, and the separate images (2)-(4) are supplied to the inter-separate image predictive coding unit 12 on a block basis of the prescribed size.

Receiving the separate image (1) from the image separating unit 1, the intra-prediction unit 2 generates the predictive image of the separate image (1) by executing the intra-prediction of the separate image (1) on a block basis.

For example, in the same manner as the AVC, it selects one of the total of nine predictive modes consisting of the average prediction and those that predict in the eight predictive directions, and generates the predictive image using pixel values of the locally decoded image in neighboring blocks stored in the frame memory 11 in accordance with the predictive mode selected.

Having generated the predictive image of the separate image (1), the intra-prediction unit 2 supplies the entropy coding processing unit 3 with the intra-differential signal representing the differential image between the predictive image and the separate image (1).

Receiving the intra-differential signal from the intra-prediction unit 2, the orthogonal transform unit 4 of the entropy coding processing unit 3 performs the orthogonal transform such as a DCT or Hadamard transform on the intra-differential signal and supplies the orthogonal transform coefficients to the quantization unit 5.

Receiving the orthogonal transform coefficients from the orthogonal transform unit 4, the quantization unit 5 of the entropy coding processing unit 3 quantizes the orthogonal transform coefficients by using a quantization parameter determined from the code amount allocation to the separate image (1), and supplies the quantization coefficients to the entropy coding unit 6 and the locally decoded image generation processing unit 7.

When the moving image is separated as shown in FIG. 3, since the adjacent pixels are separated, there is a very high correlation between separate images. Thus, when the inter-separate image predictive coding unit 12 codes the separate images (2)-(4) by using the separate image (1) as will be described later, it can reduce the code amount allocation to the differential signal.

Accordingly, the quantization parameter is set in such a manner as to increase the code amount allocation to the separate image (1).

Receiving the two-dimensional quantization coefficients from the quantization unit 5, the entropy coding unit 6 of the entropy coding processing unit 3 scans them in prescribed order, transforms to a one-dimensional quantization coefficient string, and performs entropy coding such as arithmetic coding or variable length coding of the quantization coefficient string.

Incidentally, the coded data of the separate image (1), which is a coding result of the entropy coding unit 6, is supplied to the multiplexing unit 13.

Receiving the quantization coefficients from the quantization unit 5, the dequantization unit 8 of the locally decoded image generation processing unit 7 dequantizes the quantization coefficients, and supplies the orthogonal transform coefficients obtained as a result of the dequantization to the inverse orthogonal transform unit 9.

Receiving the orthogonal transform coefficients from the dequantization unit 8, the inverse orthogonal transform unit 9 of the locally decoded image generation processing unit 7 carries out the inverse orthogonal transform of the orthogonal transform coefficients, and supplies the decoded predictive differential signal obtained as a result of the inverse orthogonal transform to the addition unit 10.

Receiving the decoded predictive differential signal from the inverse orthogonal transform unit 9, the addition unit 10 of the locally decoded image generation processing unit 7 adds the decoded predictive differential signal and the predictive image produced by the intra-prediction unit 2, and outputs the addition result, that is, the locally decoded image of the separate image (1).

Incidentally, the locally decoded image of the separate image (1) is stored in the frame memory 11.

The inter-separate image predictive coding unit 12 performs predictive coding of the separate images (2)-(4) between the separate images produced by the image separating unit 1 by using the pixels constituting the locally decoded image of the separate image (1) stored in the frame memory 11.

The processing contents of the inter-separate image predictive coding unit 12 will be described concretely below. Here, the coding of the separate image (2) will be described as an example.

The predictive image generating unit 21 of the differential image output processing unit 20, using the pixels constituting the locally decoded image of the separate image (1) stored in the frame memory 11, executes the processing of generating the predictive image of the separate image (2) produced by the image separating unit 1.

More specifically, the predictive image generating unit 21 selects from the plurality of predictive modes the predictive mode suitable for the correction of the shift in pixel positions between the separate image (1) and the separate image (2) produced by the image separating unit 1, and generates the predictive image of the separate image (2) in accordance with that predictive mode.

Here, the processing contents of the predictive image generating unit 21 will be described concretely using an example of coding the separate image (1) and separate image (2) on a block basis of a 4×4 pixel size.

Figure 4:
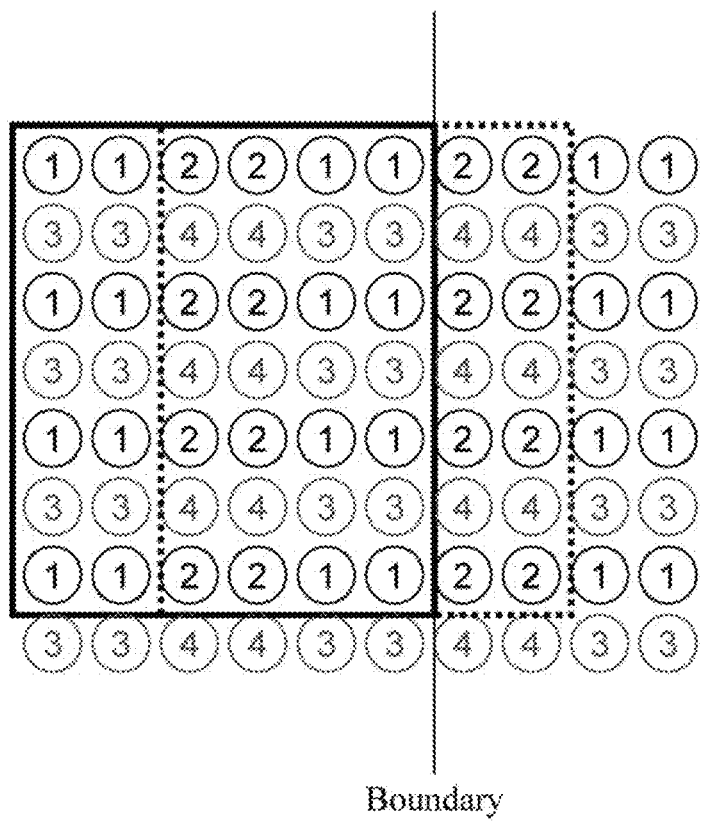
FIG. 4 is a diagram showing relationships between pixel positions of the separate image (1) and separate image (2) before separation and a coding-unit block.

FIG. 4 is a diagram showing relationships between pixel positions and coding-unit blocks of the separate image (1) and separate image (2) before separation.

FIG. 4 shows the pixels of the separate image (1) by 1 and the pixels of the separate image (2) by 2. In addition, it shows a 4×4 pixel size block of the separate image (1) by a solid line rectangle and a 4×4 pixel size block of the separate image (2) by a dotted line rectangle.

In the example of FIG. 4, the block of the separate image (1) and the block of the separate image (2) are shifted in position by two pixels in the horizontal direction.

Figure 5:
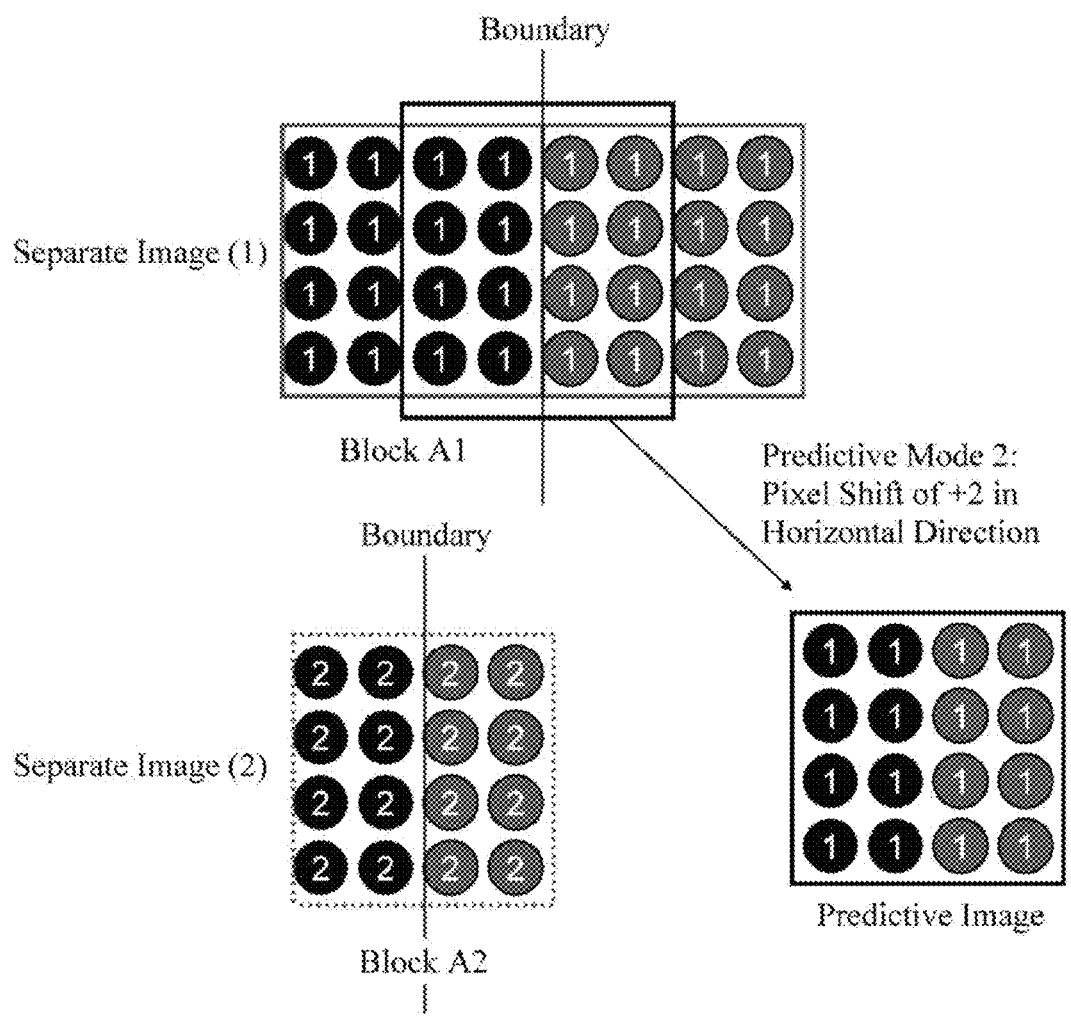
FIG. 5 is a diagram showing relationships between blocks of the separate image (1) and separate image (2) after separation.

FIG. 5 is a diagram showing relationships between blocks of the separate image (1) and separate image (2) after separation.

When a boundary of an object is at the position shown in FIG. 4, the position of the object boundary in the separate image (1) and separate image (2) after separation is as shown in FIG. 5.

When predicting a block A2 of the separate image (2) by using the pixels constituting the separate image (1), the predictive image is generated from the positions obtained by shifting the positions of the block A1 of the separate image (1) by two pixels in the right-hand direction.

Likewise, to correct a phase shift of the separate image (1) and separate image (2) in accordance with the position of the boundary, the following four types of modes are prepared as the predictive modes.

TABLE 1

| predictive mode 0 | right behind |
| predictive mode 1 | shift pixels +1 in horizontal direction |
| predictive mode 2 | shift pixels +2 in horizontal direction |
| predictive mode 3 | average image of predictive images obtained in predictive modes 0, 1, 2 |

Among the four types of the predictive modes, the predictive mode 2 is a mode of generating a predictive image from positions that are shifted by two pixels in the horizontal right-hand direction as shown in FIG. 5.

Figure 6:
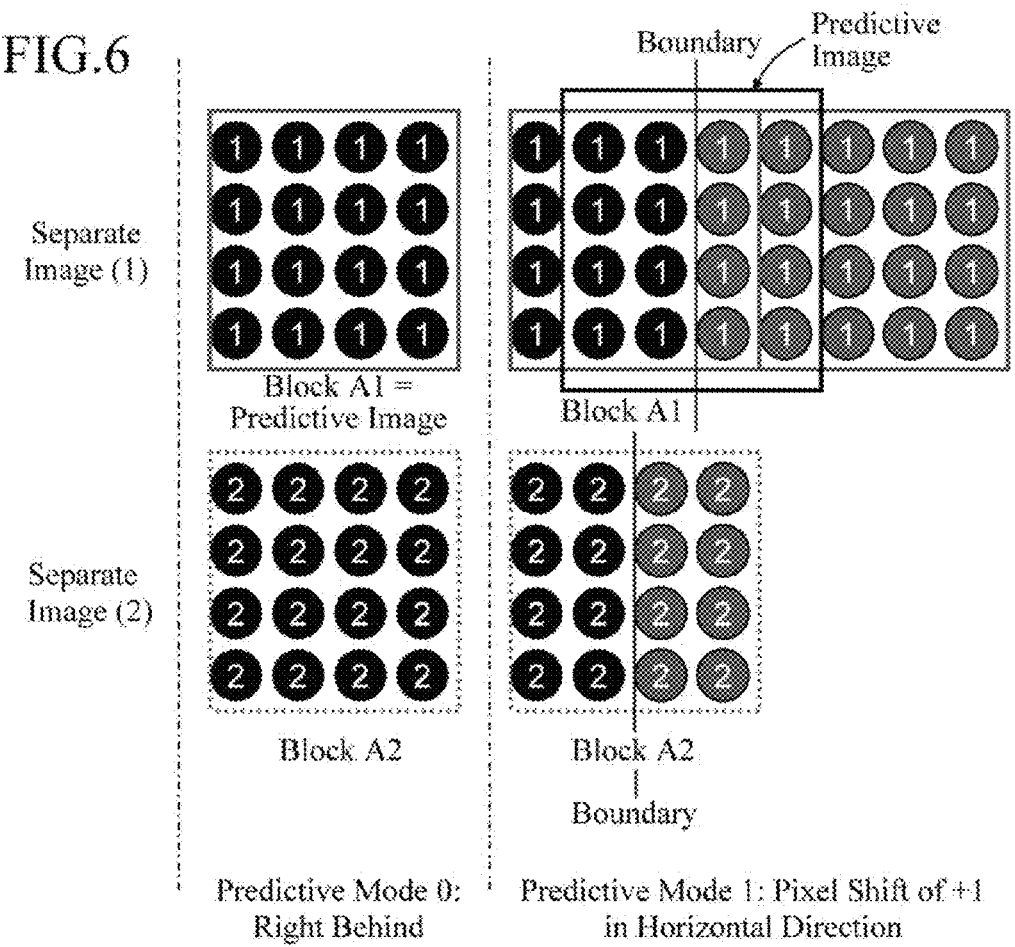
FIG. 6 is a diagram showing an example of predictive images produced in a case of a predictive mode 0 and predictive mode 1.

FIG. 6 is a diagram showing examples of generating predictive images in the predictive mode 0 and predictive mode 1.

The predictive mode 0, which is a right behind mode, causes the block A1 of the separate image (1) to become the predictive image of the block A2 of the separate image (2).

The predictive mode 1 is a mode of generating the predictive image from the positions obtained by shifting the position of the block A1 of the separate image (1) by one pixel in the right-hand direction.

Figure 7:
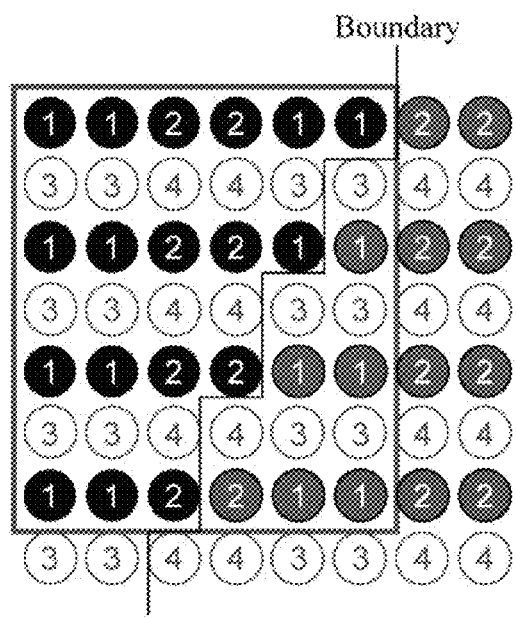
FIG. 7 is a diagram showing a case where there is an object boundary in an oblique direction unequal to 45 degrees.
Figure 8:
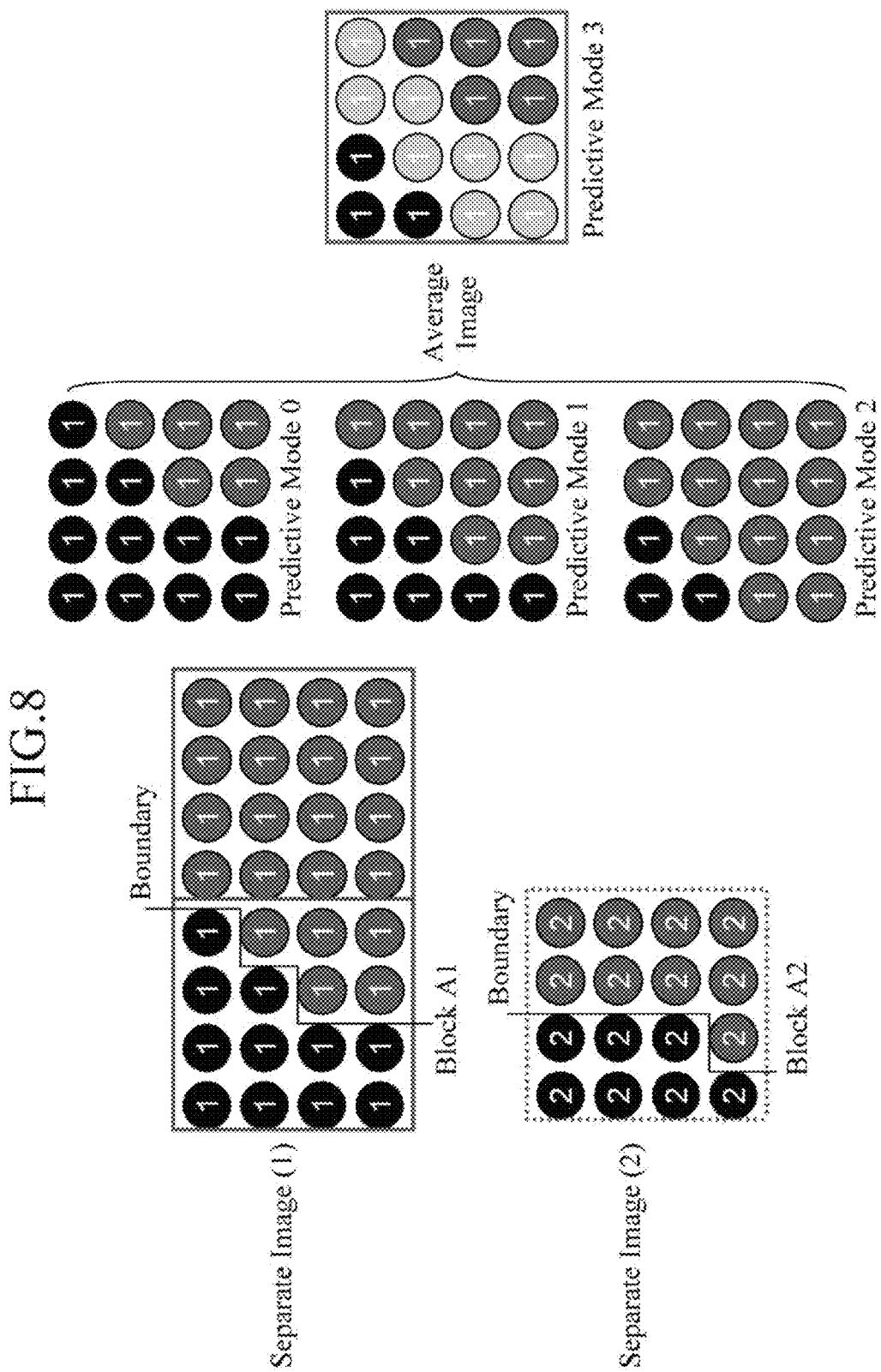
FIG. 8 is a diagram showing an example of predictive images produced in a predictive mode 3.

FIG. 7 is a diagram showing the case where an object boundary is in an oblique direction different from 45 degrees, and FIG. 8 is a diagram showing a generating example of a predictive image in the predictive mode 3.

The predictive mode 3 is an effective generating method of a predictive image when an object boundary is in an oblique direction unequal to 45 degrees as shown in FIG. 7.

The object boundary between the block A1 of the separate image (1) and the block A2 of the separate image (2) is as shown in FIG. 8.

A predictive image of the predictive mode 3 is an average image of the predictive images in the predictive mode 0, predictive mode 1, and predictive mode 2.

As a method of selecting the optimum predictive mode from the four types of the predictive modes, a method can be employed which obtains all the mean squares (MSE) of the error signals between the predictive images generated by the four types of the predictive modes and the block A2 of the separate image (1), and selects the predictive mode that will minimize the MSE.

Incidentally, the predictive mode selected by the predictive image generating unit 21 is supplied to the entropy coding unit 26 to be multiplexed to a bit stream, and the predictive image produced by the predictive image generating unit 21 is supplied to the subtraction unit 22.

When the predictive image generating unit 21 generates the predictive image, the subtraction unit 22 of the differential image output processing unit 20 obtains the differential image between the predictive image and the separate image (2) produced by the image separating unit 1, and supplies the predictive differential signal representing the differential image to the entropy coding processing unit 23.

Receiving the predictive differential signal from the differential image output processing unit 20, the orthogonal transform unit 24 of the entropy coding processing unit 23 performs the orthogonal transform such as a DCT or Hadamard transform on the predictive differential signal, and supplies the orthogonal transform coefficients to the quantization unit 25.

Receiving the orthogonal transform coefficients from the orthogonal transform unit 24, the quantization unit 25 of the entropy coding processing unit 23, using the quantization parameter determined from the code amount allocation to the separate image (2), quantizes the orthogonal transform coefficients, and supplies the quantization coefficients to the entropy coding unit 26.

Receiving the two-dimensional quantization coefficients from the quantization unit 25, the entropy coding unit 26 of the entropy coding processing unit 23 scans them in prescribed order to transform them to a one-dimensional quantization coefficient string, and carries out entropy coding such as arithmetic coding or variable length coding of the quantization coefficient string.

In addition, receiving the predictive mode from the predictive image generating unit 21, the entropy coding unit 26 carries out the entropy coding like arithmetic coding or variable length coding of the predictive mode.

Incidentally, the coded data of the separate image (2) (including the coded data of the predictive mode), which is a coding result of the entropy coding unit 26, is supplied to the multiplexing unit 13.

As for the separate images (3) and (4), although they are coded in the same manner as the separate image (2) by using the locally decoded image of the separate image (1), they differ from the separate image (2) in the direction of the phase shift from the separate image (1) as shown in FIG. 3.

Accordingly, the predictive modes differ from those of the separate image (2), and hence they will be described below.

The block of the separate image (1) and the block of the separate image (3) are shifted in position by one pixel in the vertical direction. To correct the phase shift between the separate image (1) and separate image (3), the following three types are prepared as the predictive modes.

TABLE 2

| | |
|---|---|
| predictive mode 0 | right behind |
| predictive mode 1 | shift pixels +1 in vertical direction |
| predictive mode 2 | average image of predictive images obtained in predictive modes 0, 1 |

The block of the separate image (1) and the block of the separate image (4) are shifted in position by two pixels in the horizontal direction and one pixel in the vertical direction. To correct the phase shift between the separate image (1) and separate image (4), the following seven types are prepared as the predictive modes.

TABLE 3

| | |
|---|---|
| predictive mode 0 | right behind |
| predictive mode 1 | shift pixels +2 in horizontal direction; no shift in vertical direction |
| predictive mode 2 | shift pixels +1 in horizontal direction; no shift in vertical dilation |
| predictive mode 3 | no shift in horizontal direction; shift pixels +1 in vertical direction |
| predictive mode 4 | shift pixels +2 in horizontal direction; shift pixels +1 in vertical direction |
| predictive mode 5 | shift pixels +1 in horizontal direction; shift pixels +1 in vertical direction |
| predictive mode 6 | average image of predictive images obtained in predictive modes 0, 1, 2, 3, 4, 5, 6 |

Receiving the coded data of the separate image (1) from the entropy coding processing unit 3 and receiving the coded data of the separate images (2)-(4) from the inter-separate image predictive coding unit 12, the multiplexing unit 13 multiplexes the coded data to generate a bit stream.

The generation processing of the bit stream in the multiplexing unit 13 will be described concretely below.

When the separate image (1), separate image (2), separate images (3), and separate images (4) are coded on a block basis of the prescribed size, a unit consisting of one or more blocks is referred to as a slice.

Figure 9:
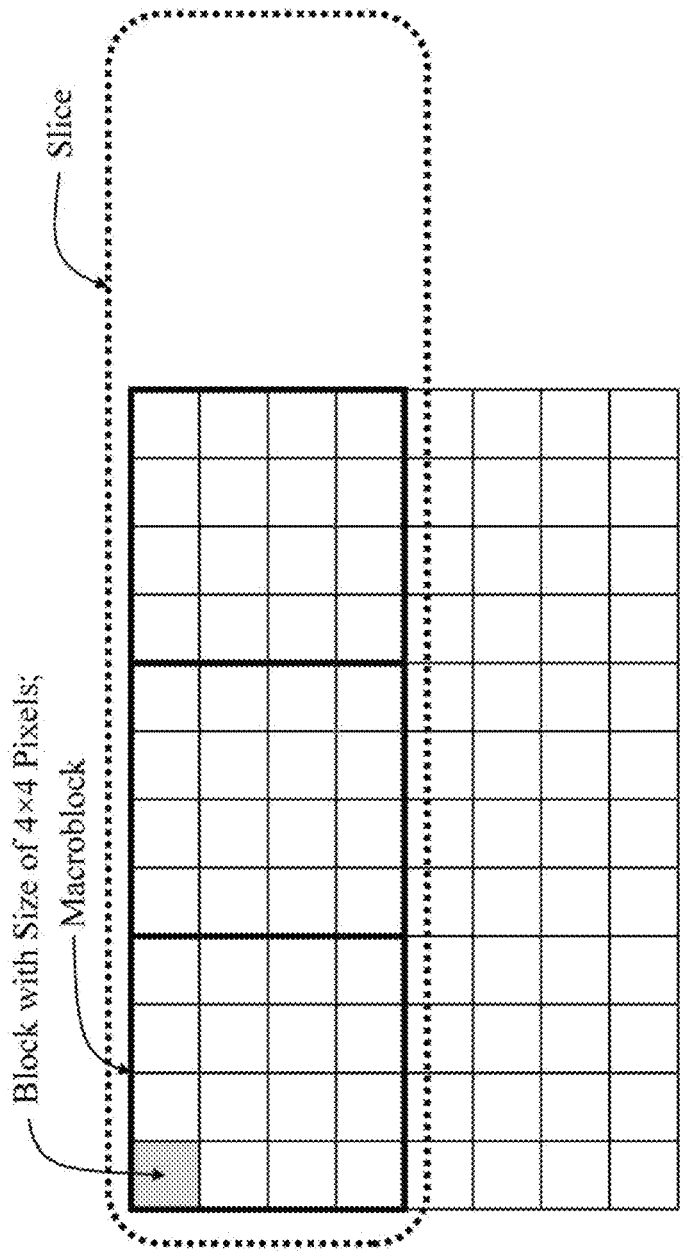
FIG. 9 is a diagram showing relationships between blocks, which are a minimum unit of prediction or orthogonal transform, macroblocks and a slice.

The AVC refers to a minimum unit (4×4 pixel size in FIG. 9) of the prediction and orthogonal transform as a block as shown in FIG. 9, refers to a plurality of blocks collected into a unit (4×4 blocks (16×16 pixel size) in FIG. 9) as a macroblock, and refers to one or more macroblocks collected into a unit as a slice. It is inhibited to carry out predictive coding beyond a slice boundary within a picture.

The coding method in accordance with the present invention can also form a slice as the AVC. Likewise, the coded data from the individual separate images are supplied to the multiplexing unit 13 on a slice basis.

At the head of a slice, the following are multiplexed as part of header information: a slice ID for identifying the slice; a unique word (start code) for indicating the start of the slice; an ID (separate image ID) for identifying to which separate image the slice belongs among the separate image (1), separate image (2), separate image (3) and separate image (4); and the ID of the slice (slice ID).

A picture can comprise a plurality of slices, and the slices of the separate image (1), separate image (2), separate image (3) and separate image (4) can be interleaved and multiplexed into a single bit stream. However, since the separate image (1) is referred to as the predictive image at the decoding of the separate image (2), separate image (3) and separate image (4), the slices of the separate image (1) must be multiplexed before the slices of the separate image (2), separate image (3) and separate image (4).

As is clear from the above, according to the present embodiment 1, it is configured in such a manner that it includes the image separating unit 1 for generating the four separate images (1), (2), (3) and (4) by sampling the pixels constituting the input image every two alternate pixels in the horizontal direction and each alternate pixel in the vertical direction, that the intraframe predictive coding unit carries out predictive coding of the separate image (1) within a frame by using pixels constituting the separate image (1) produced by the image separating unit 1, and that the inter-separate image predictive coding unit 12 carries out the predictive coding of the separate images (2), (3) and (4) between the separate images produced by the image separating unit 1 by using the pixels constituting the separate image (1) produced by the image separating unit 1. Accordingly, it offers an advantage of being able to achieve high coding efficiency while suppressing the image quality deterioration and the increase in the circuit size.

In addition, according to the present embodiment 1, since it forms slices independently of each separate image, it can execute coding processing in parallel. As a result, it offers an advantage of being able to reduce the circuit size of the moving image encoder.

Incidentally, although the present embodiment 1 shows an example in which the image separating unit 1 generates the four separate images (1), (2), (3) and (4) by sampling the pixels constituting the input image every two alternate pixels in the horizontal direction and each alternate pixel in the vertical direction, it is also possible to generate K (K is two or more) separate images by sampling at every N (N is one or more) pixels in the horizontal direction and at every M (M is one or more) pixels in the vertical direction.

In addition, it is also possible to generate the separate images in a single direction of either the horizontal direction or vertical direction.

Besides, although the present embodiment 1 shows an example in which the intra-prediction unit 2 selects one of the total of nine predictive modes which predict from the average prediction and eight predictive directions as the AVC to carry out the intra-prediction, since the separate image (1) is acquired by sampling in the horizontal direction and vertical direction, it sometimes does not have correlation in an oblique direction.

Accordingly, it is also possible to reduce the predictive modes to three modes of the average prediction, horizontal prediction and vertical prediction, and to select one of the three modes to carry out the intra-prediction.

Furthermore, although the present embodiment 1 shows an example of performing the orthogonal transform such as a DCT or Hadamard transform on the predictive differential signal obtained as a result of the intra-prediction, since the separate images (1), (2), (3) and (4) are images acquired by sampling adjacent pixels, they closely resemble each other in structure. Thus, when predicting the separate images (2) (3) and (4) by using the separate image (1), the differential signal after the prediction sometimes does not have two-dimensional correlation left.

In such a case, it can directly code using PCM or DPCM without applying the orthogonal transform. Alternatively, it is also possible to switch between the orthogonal transform and the PCM or DPCM coding from macroblock to macroblock. In this case, it can also code the switching information in accordance with a macroblock type.

Embodiment 2

Figure 10:
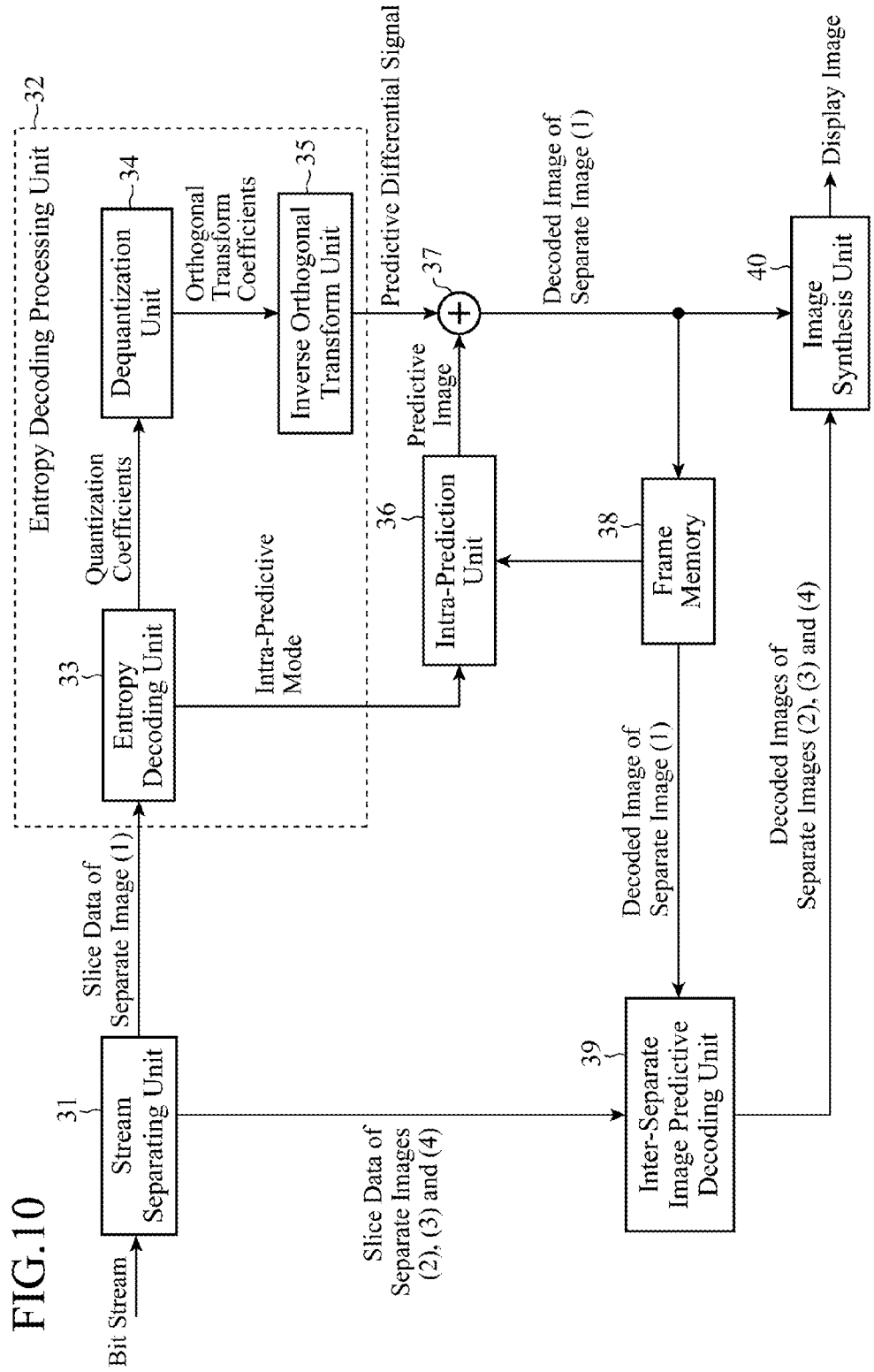
FIG. 10 is a block diagram showing a configuration of a moving image decoder of an embodiment 2 in accordance with the present invention.

FIG. 10 is a block diagram showing a configuration of a moving image decoder of an embodiment 2 in accordance with the present invention.

In FIG. 10, a stream separating unit 31 executes processing of receiving a bit stream transmitted from the moving image encoder of FIG. 1, and of separating from the bit stream the slice data (coded data) of the separate image (1) and the slice data (coded data) of the separate images (2) (3) and (4). Incidentally, the stream separating unit 31 constitutes a coded data separating unit.

An entropy decoding processing unit 32 executes processing of decoding the intra-predictive mode and the predictive differential signal by carrying out entropy decoding of the slice data of the separate image (1) separated by the stream separating unit 31 on a block basis of the prescribed size. Incidentally, the entropy decoding processing unit 32 constitutes a first entropy decoding processing unit.

An entropy decoding unit 33 of the entropy decoding processing unit 32 executes processing of decoding the intra-predictive mode and the quantization coefficients by carrying out entropy decoding of the slice data of the separate image (1) separated by the stream separating unit 31 on a block basis of the prescribed size.

A dequantization unit 34 of the entropy decoding processing unit 32 executes processing of dequantizing the quantization coefficients decoded by the entropy decoding unit 33, and of supplying the orthogonal transform coefficients obtained as a result of the dequantization to an inverse orthogonal transform unit 35.

The inverse orthogonal transform unit 35 of the entropy decoding processing unit 32 executes processing of carrying out the inverse orthogonal transform of the orthogonal transform coefficients supplied from the dequantization unit 34, and of supplying the predictive differential signal obtained as a result of the inverse orthogonal transform to an addition unit 37.

According to the intra-predictive mode passing through the entropy decoding by the entropy decoding processing unit 32, an intra-prediction unit 36 executes processing of generating the predictive image of the separate image (1) by using the pixel values of the decoded image of the neighboring blocks stored in a frame memory 38. Incidentally, the intra-prediction unit 36 constitutes a first predictive image generation processing unit.

The addition unit 37 executes processing of adding the predictive image of the separate image (1) produced by the intra-prediction unit 36 and the predictive differential signal supplied from the inverse orthogonal transform unit 35, and of supplying the decoded image of the separate image (1), which is the addition result, to the frame memory 38 and an image synthesis unit 40. Incidentally, the addition unit 37 constitutes a first decoded image output processing unit.

The frame memory 38 is a memory for storing the decoded image of the separate image (1) output from the addition unit 37.

The entropy decoding processing unit 32, intra-prediction unit 36 and addition unit 37 constitute an intraframe predictive decoding unit.

Using the decoded image of the separate image (1) stored in the frame memory 38, the inter-separate image predictive decoding unit 39 executes processing of decoding the slice data of the separate images (2) (3) and (4) separated by the stream separating unit 31, and of supplying the decoded image of the separate images (2) (3) and (4) to an image synthesis unit 40. Incidentally, the inter-separate image predictive decoding unit 39 constitutes an inter-separate image predictive decoding unit.

The image synthesis unit 40 executes processing of generating a display image by combining the decoded image of the separate image (1) output from the addition unit 37 and the decoded images of the separate images (2) (3) and (4) output from the inter-separate image predictive decoding unit 39. Incidentally, the image synthesis unit 40 constitutes an image synthesis unit.

Figure 11:
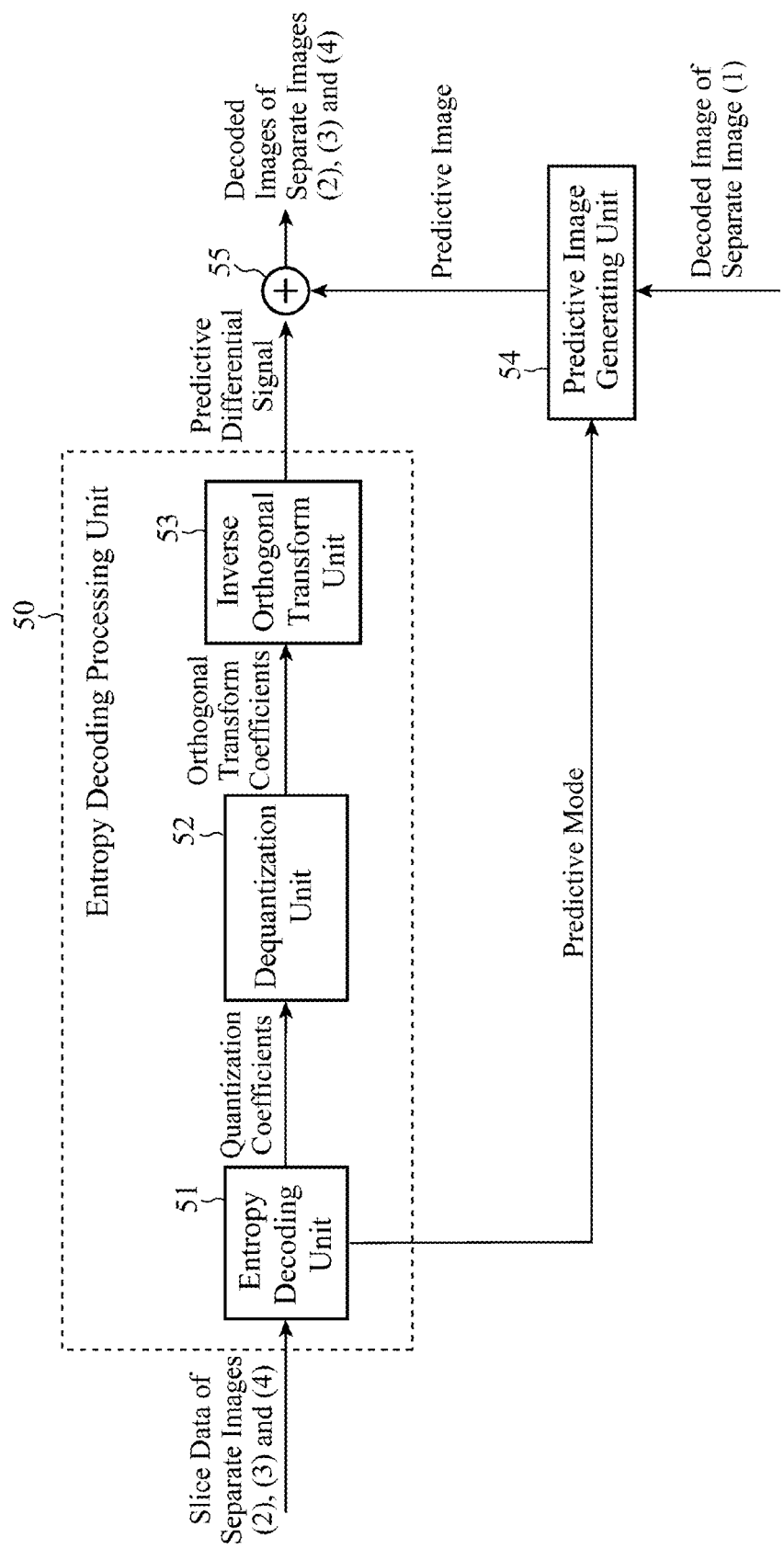
FIG. 11 is a block diagram showing a configuration of an inter-separate image predictive decoding unit 39 of the moving image decoder of the embodiment 2 in accordance with the present invention.

FIG. 11 is a block diagram showing a configuration of the inter-separate image predictive decoding unit 39 of the moving image decoder of the embodiment 2 in accordance with the present invention. In FIG. 11, an entropy decoding processing unit 50 executes processing of decoding the inter-separate-image predictive mode and the predictive differential signal by carrying out entropy decoding of the slice data of the separate images (2) (3) and (4) separated by the stream separating unit 31 on a block basis of the prescribed size. Incidentally, the entropy decoding processing unit 50 constitutes a second entropy decoding processing unit.

An entropy decoding unit 51 of the entropy decoding processing unit 50 executes processing of decoding the inter-separate-image predictive mode and the quantization coefficients by carrying out entropy decoding of the slice data of the separate images (2) (3) and (4) separated by the stream separating unit 31 on a block basis of the prescribed size.

A dequantization unit 52 of the entropy decoding processing unit 50 executes processing of dequantizing the quantization coefficients decoded by the entropy decoding unit 51, and of supplying the orthogonal transform coefficients obtained as a result of the dequantization to an inverse orthogonal transform unit 53.

The inverse orthogonal transform unit 53 of the entropy decoding processing unit 50 executes processing of carrying out an inverse orthogonal transform of the orthogonal transform coefficients output from the dequantization unit 52, and of supplying the predictive differential signal obtained as a result of the inverse orthogonal transform to an addition unit 55.

According to the inter-separate-image predictive mode resulting from the entropy decoding by the entropy decoding unit 51, a predictive image generating unit 54 executes processing of producing the predictive images of the separate images (2) (3) and (4) by using the decoded image of the separate image (1) stored in the frame memory 38. Incidentally, the predictive image generating unit 54 constitutes a second predictive image generation processing unit.

The addition unit 55 executes processing of adding the predictive images of the separate images (2) (3) and (4) produced by the predictive image generating unit 54 and the predictive differential signal output from the inverse orthogonal transform unit 53, and of outputting the decoded images of the separate images (2) (3) and (4), which are addition results. Incidentally, the addition unit 55 constitutes a second decoded image output processing unit.

Next, the operation will be described.

Receiving the bit stream transmitted from the moving image encoder of FIG. 1, the stream separating unit 31 decodes the separate image IDs on a slice basis divided by a unique word, thereby separating the slice data of the separate image (1) and the slice data of the separate images (2) (3) and (4) from the bit stream.

Receiving the slice data of the separate image (1) from the stream separating unit 31, the entropy decoding unit 33 decodes the intra-predictive mode and one-dimensional quantization coefficient string of a unit block of the prescribed size by executing the entropy decoding such as the arithmetic decoding or variable length decoding of the slice data of the separate image (1).

In addition, the entropy decoding unit 33 transforms the one-dimensional quantization coefficient string into the two-dimensional quantization coefficients by scanning it in the prescribed order.

Receiving the quantization coefficients from the entropy decoding unit 33, the dequantization unit 34 dequantizes the quantization coefficients in accordance with the quantization parameter (not shown) decoded by the entropy decoding unit 33, and supplies the orthogonal transform coefficients obtained as a result of the dequantization to the inverse orthogonal transform unit 35.

Receiving the orthogonal transform coefficients from the dequantization unit 34, the inverse orthogonal transform unit 35 performs the inverse orthogonal transform such as a DCT or Hadamard transform on the orthogonal transform coefficients, and supplies the predictive differential signal obtained as a result of the inverse orthogonal transform to the addition unit 37.

Receiving the intra-predictive mode from the entropy decoding unit 33, the intra-prediction unit 36 generates the predictive image of the separate image (1) by using the pixel values of the decoded image of the neighboring blocks stored in the frame memory 38 in accordance with the intra-predictive mode in the same manner as the intra-prediction unit 2 in the moving image encoder of FIG. 1.

The intra-predictive mode the intra-prediction unit 36 uses is the same as the predictive mode the intra-prediction unit 2 in the moving image encoder of FIG. 1 uses. It is the predictive mode selected from the total of nine predictive modes consisting of the average prediction and the predictions made from eight predictive directions.

When the intra-prediction unit 36 generates the predictive image of the separate image (1), the addition unit 37 adds the predictive image of the separate image (1) and the predictive differential signal output from the inverse orthogonal transform unit 35, and supplies the decoded image of the separate image (1) which is the addition result to the frame memory 38 and image synthesis unit 40.

Receiving the slice data of the separate images (2) (3) and (4) from the stream separating unit 31, the inter-separate image predictive decoding unit 39 decodes the slice data of the separate images (2) (3) and (4) by using the decoded image of the separate image (1) stored in the frame memory 38, and supplies the decoded images of the separate images (2) (3) and (4) to the image synthesis unit 40.

The processing contents of the inter-separate image predictive decoding unit 39 will be described concretely below. Here, an example of decoding the slice data of the separate image (2) will be described.

Receiving the slice data of the separate image (2) from the stream separating unit 31, the entropy decoding unit 51 of the inter-separate image predictive decoding unit 39 performs the entropy decoding such as arithmetic decoding or variable length decoding of the slice data of the separate image (2) to decode the inter-separate-image predictive mode and the quantization coefficients of a unit block of the prescribed size.

In addition, the entropy decoding unit 51 transforms the one-dimensional quantization coefficient string into the two-dimensional quantization coefficients by scanning it in the prescribed order.

Receiving the quantization coefficients from the entropy decoding unit 51, the dequantization unit 52 dequantizes the quantization coefficients in accordance with the quantization parameter (not shown) decoded by the entropy decoding unit 51, and supplies the orthogonal transform coefficients obtained as a result of the dequantization to the inverse orthogonal transform unit 53.

Receiving the orthogonal transform coefficients from the dequantization unit 52, the inverse orthogonal transform unit 53 performs the inverse orthogonal transform such as a DCT or Hadamard transform on the orthogonal transform coefficients, and supplies the predictive differential signal obtained as a result of the inverse orthogonal transform to the addition unit 55.

Receiving the inter-separate-image predictive mode from the entropy decoding unit 51, the predictive image generating unit 54 generates the predictive image of the separate image (2) by using the decoded image of the separate image (1) stored in the frame memory 38 in accordance with the inter-separate-image predictive mode.

As for the types of the predictive modes and the generating method of the predictive image, they are the same as those of the predictive image generating unit 21 in the moving image encoder of the embodiment 1.

When the predictive image generating unit 54 produces the predictive image of the separate image (2), the addition unit 55 adds the predictive image of the separate image (2) and the predictive differential signal output from the inverse orthogonal transform unit 53, and supplies the image synthesis unit 40 with the decoded image of the separate image (2) which is the addition result.

As for the slice data of the separate image (3) and separate image (4), they are decoded in the same manner as the separate image (2), and the decoded image of the separate image (3) and the decoded image of the separate image (4) are supplied to the image synthesis unit 40.

The image synthesis unit 40 generates a display image by combining the decoded image of the separate image (1) output from the addition unit 37 and the decoded images of the separate images (2) (3) and (4) output from the inter-separate image predictive decoding unit 39.

More specifically, the image synthesis unit 40, receiving the decoded image of the separate image (1) from the addition unit 37 and the decoded images of the separate images (2) (3) and (4) from the inter-separate image predictive decoding unit 39, produces the display image by combining them into one image through a procedure reverse to that of the image separating unit 1 in the moving image encoder of the embodiment 1.

Pixel positions in the image after combining the individual separate images is the same as those of the input image of FIG. 3.

As is clear from the above, according to the present embodiment 2, it is configured in such a manner that it includes the stream separating unit 31 for receiving the bit stream, into which the slice data of the separate image (1) and the slice data of the separate images (2) (3) and (4) are multiplexed, and for separating from the bit stream the slice data of the separate image (1) and the slice data of the separate images (2) (3) and (4); that the intraframe predictive decoding unit decodes the slice data of the separate image (1) separated by the stream separating unit 31 to output the decoded image of the separate image (1); and that the inter-separate image predictive decoding unit 39 decodes the coded data of the separate images (2) (3) and (4) separated by the stream separating unit 31 by using the decoded image of the separate image (1) separated by the stream separating unit 31 to output the decoded images of the separate images (2) (3) and (4). Accordingly, it offers an advantage of being able to decode the images that are coded correctly at high coding efficiency and to display the original images with the high resolution.

In addition, according to the present embodiment 2, it is configured in such a manner as to decode the slice data produced independently for each separate image. Accordingly, it can carry out the decoding processing in parallel. As a result, it offers an advantage of being able to reduce the circuit size of the moving image decoder.

Incidentally, although the present embodiment 2 shows an example in which the image synthesis unit 40 generates the original display image with the high resolution by combining the four separate images after decoding all the separate images, a configuration is also possible which displays a low resolution image by delivering to a display device the decoded image of the separate image (1) first which has passed through the decoding processing previously as a display image.

After that, as soon as the decoding of the separate image (2), separate image (3) and separate image (4) has been completed, they are successively combined with the decoded image of the separate image (1) to generate a high resolution display image so that the resolution of the image to be displayed on the display device is increased step by step.

As for the order of images to be displayed on the display device, the following are conceived, for example.

Separate Image (1)→Synthesized Image (separate image (1)+separate image (2))→Synthesized Image (separate image (1)+separate image (2)+separate image (3))→Synthesized Image (separate image (1)+separate image (2)+separate image (3)+separate image (4))

At the time of editing a stream or playing back thumbnail images or as for a playback device with a low processing capacity, it is also possible to decode the slice data with the separate image ID corresponding to the separate image (1), thereby decoding and displaying the image with a ¼ resolution.

INDUSTRIAL APPLICABILITY

The moving image encoder and moving image decoder in accordance with the present invention can implement high coding efficiency while suppressing the image quality deterioration and an increase of the circuit size. Accordingly, it is suitable for a moving image encoder that separates an image into a plurality of pieces and codes them, and for a moving image decoder that decodes the images that are separated into a plurality of pieces and are coded.

What is claimed is:

1. A moving image encoder comprising:

a separate image generating unit for producing a first separate image by sampling pixels constituting an input image at predetermined intervals, and for producing at least one second separate image by sampling pixels different from the foregoing pixels at predetermined intervals;

an intraframe predictive coding unit for carrying out predictive coding of the first separate image within a frame by using the pixels constituting the first separate image produced by the separate image generating unit;

an inter-separate image predictive coding unit for carrying out, between the first and second separate images, predictive coding of the second separate image produced by the separate image generating unit by using the pixels constituting the first separate image produced by the separate image generating unit; and a multiplexing unit for generating a bit stream by multiplexing coded data of the first separate image output from the intraframe predictive coding unit and coded data of the second separate image output from the inter-separate image predictive coding unit, wherein the intraframe predictive coding unit comprises:

a first differential image output processing unit for generating a predictive image of the first separate image by executing intraframe prediction of the first separate image produced by the separate image generating unit on a block basis of a prescribed size, and for outputting a differential image between the first separate image and the predictive image;

a first entropy coding processing unit for carrying out an orthogonal transform of the differential image output from the first differential image output processing unit on a block basis, and for performing entropy coding of orthogonal transform coefficients obtained as a result of the orthogonal transform; and a locally decoded image generation processing unit for producing a locally decoded image of the first separate image by performing an inverse orthogonal transform of the orthogonal transform coefficients and by adding a decoded predictive differential signal obtained as a result of the inverse orthogonal transform and the predictive image, and wherein the inter-separate image predictive coding unit comprises:

a second differential image output processing unit for generating a predictive image of the second separate image produced by the separate image generating unit by using pixels constituting the locally decoded image of the first separate image produced by the locally decoded image generation processing unit, and for outputting a differential image between the second separate image and the predictive image; and a second entropy coding processing unit for carrying out an orthogonal transform of the differential image output from the second differential image output processing unit on a block basis, and for performing entropy coding of the orthogonal transform coefficients obtained as a result the orthogonal transform, and wherein the second differential image output processing unit of the inter-separate image predictive coding unit selects from a plurality of predictive modes a predictive mode suitable for correcting a shift in pixel positions between the first separate image and the second separate image produced by the separate image generating unit when generating the predictive image of the second separate image produced by the separate image generating unit, and generates the predictive image of the second separate image in that predictive mode, and the second entropy coding processing unit carries out entropy coding of the predictive mode selected by the second differential image output processing unit.

2. The moving image encoder according to claim 1, wherein the intraframe predictive coding unit codes the first separate image in conformity with "MPEG-4 AVC/H.264" standards.

3. The moving image encoder according to claim 1, wherein the multiplexing unit generates, when multiplexing the coded data of the first separate image and the coded data of the second separate image, the bit stream by multiplexing them on a slice basis, the slice consisting of one or more blocks used as a unit of coding, the first and second separate images producing their slices independently, and a header of each slice having an ID multiplexed for identifying the first and second separate images.

4. A moving image decoder comprising:
a coded data separating unit for receiving a bit stream into which coded data of a first separate image and coded data of a second separate image are multiplexed, and for separating the coded data of the first separate image and the coded data of the second separate image from the bit stream;
an intraframe predictive decoding unit for obtaining a decoded image of the first separate image by decoding the coded data of the first separate image separated by the coded data separating unit;
an inter-separate image predictive decoding unit for obtaining a decoded image of the second separate image by decoding the coded data of the second separate image separated by the coded data separating unit by using the decoded image of the first separate image obtained by the intraframe predictive decoding unit; and
an image synthesis unit for generating a display image by combining the decoded image of the first separate image obtained by the intraframe predictive decoding unit and the decoded image of the second separate image obtained by the inter-separate image predictive decoding unit, wherein the image synthesis unit increases resolution of the display image step by step by displaying as the display image the decoded image of the first separate image obtained by the intraframe predictive decoding unit, followed by displaying the display image generated by combining the decoded image of the first separate image and the decoded image of the second separate image.

5. The moving image decoder according to claim 4, wherein the intraframe predictive decoding unit comprises:
a first entropy decoding processing unit for performing entropy decoding of the coded data of the first separate image separated by the coded data separating unit on a block basis of a prescribed size, thereby carrying out an inverse orthogonal transform thereof;
a first predictive image generation processing unit for producing a predictive image of the first separate image by executing intraframe prediction in accordance with a predictive mode obtained by the entropy decoding of the first entropy decoding processing unit; and
a first decoded image output processing unit for adding the predictive image produced by the first predictive image generation processing unit and a predictive differential signal which is a result of the inverse orthogonal transform by the first entropy decoding processing unit, and for outputting a decoded image of the first separate image, which is a result of the addition, and wherein the inter-separate image predictive decoding unit comprises:
a second entropy decoding processing unit for performing entropy decoding of the coded data of the second separate image separated by the coded data separating unit on a block basis of the prescribed size, thereby carrying out an inverse orthogonal transform thereof;
a second predictive image generation processing unit for producing a predictive image of the second separate image by executing inter-separate image prediction by using the decoded image of the first separate image output from the first decoded image output processing unit; and
a second decoded image output processing unit for adding the predictive image produced by the second predictive image generation processing unit and a predictive differential signal which is a result of the inverse orthogonal transform of the second entropy decoding processing unit, and for outputting a decoded image of the second separate image which is a result of the addition.

* * * * *